United States Patent
Blencoe

(10) Patent No.: US 7,972,584 B2
(45) Date of Patent: Jul. 5, 2011

(54) MAGNESIOTHERMIC METHODS OF PRODUCING HIGH-PURITY SILICON

(75) Inventor: James G. Blencoe, Harriman, TN (US)

(73) Assignee: Orion Laboratories, LLC, Toledo, OH (US)

(*) Notice: Subject to any disclaimer, the term of this patent is extended or adjusted under 35 U.S.C. 154(b) by 0 days.

(21) Appl. No.: 12/547,162

(22) Filed: Aug. 25, 2009

(65) Prior Publication Data

US 2010/0158782 A1    Jun. 24, 2010

Related U.S. Application Data

(60) Provisional application No. 61/189,991, filed on Aug. 25, 2008.

(51) Int. Cl.
C01B 33/02 (2006.01)
C01F 5/02 (2006.01)
C01F 5/14 (2006.01)
C01F 11/02 (2006.01)

(52) U.S. Cl. .................. 423/350; 423/348; 423/635

(58) Field of Classification Search .......... 423/348–350, 423/635
See application file for complete search history.

(56) References Cited

U.S. PATENT DOCUMENTS

| | | | |
|---|---|---|---|
| 4,102,764 A * | 7/1978 | Harvey et al. ............... 204/164 |
| 5,090,996 A | 2/1992 | Cameron | |
| 5,139,762 A | 8/1992 | Flagella | |
| 5,279,716 A | 1/1994 | Sharma | |
| 5,803,947 A | 9/1998 | Engell et al. | |
| 2008/0038170 A1 | 2/2008 | Sandhage et al. | |
| 2009/0010833 A1* | 1/2009 | Rosenband et al. ......... 423/349 |
| 2009/0241730 A1* | 10/2009 | Gladkov ....................... 75/392 |

FOREIGN PATENT DOCUMENTS

| | | |
|---|---|---|
| EP | 1857640 A2 | 11/2007 |
| JP | 54058247 A | 5/1979 |
| RU | 2036143 C1 * | 5/1995 |
| WO | W02004101434 A1 | 11/2004 |
| WO | W02008046018 A1 | 4/2008 |

OTHER PUBLICATIONS

Hussain et al., "Extraction of Silicon from Rice Husk Ash", The Arabian Journal for Science and Engineering, vol. 15, No. 3, Jul. 1990.*

(Continued)

*Primary Examiner* — Stanley Silverman
*Assistant Examiner* — Anthony J Zimmer
(74) *Attorney, Agent, or Firm* — King & Spalding L.L.P.

(57) ABSTRACT

Magnesiothermic methods of producing solid silicon are provided. In a first embodiment, solid silica and magnesium gas are reacted at a temperature from 400° C. to 1000° C. to produce solid silicon and solid magnesium oxide, the silicon having a purity from 98.0 to 99.9999%. The silicon is separated from the magnesium oxide using an electrostatic technology. In a second embodiment, the solid silicon is reacted with magnesium gas to produce solid magnesium silicide. The magnesium silicide is contacted with hydrogen chloride gas or hydrochloric acid to produce silane gas. The silane gas is thermally decomposed to produce solid silicon and hydrogen gas, the silicon having a purity of at least 99.9999%. The solid silicon and hydrogen gas are separated into two processing streams. The hydrogen gas is recycled for reaction with chlorine gas to produce hydrogen chloride gas.

39 Claims, 4 Drawing Sheets

OTHER PUBLICATIONS

Bao et al., Chemical reduction of three-dimensional silica micro-assemblies into microporous silicon replicas, Nature Publishing Group, vol. 446, p. 172-175, Mar. 8, 2007, doe:10.1038/nature05570.

CEP (reprinted with permission from Chemical Engineering Progress), Polysilicon Business Shines Brightly, www.alche.org/cep, Aug. 2008, p. 8-11.

Kent et al., Hydrogen, lithium, and boron in mantle-derived olivine: The role of 'coupled substitutions, American Mineralogist; Oct. 2002; v. 87; No. 10; p. 1432-1436 © 2002 Mineralogical Society-of America, http://ammin.geoscienceworld.org/cgi/content/abstract/87/10/1432.

Kohls et al., 150. New-generation precipitated silica for tire-tread compounds, 2006 ACS Central Regional Meeting and 39th Silicon Symposium, p. 87.

Odden et al, "From monosilane to crystalline silicon, part II: Kinetic considerations on thermal decomposition of pressurized monosilane", International Journal of Chemical Kinetics, vol. 38, issue 5, pp. 309-321, Mar. 2006.

Pal, A Lower Carbon Footprint Process for Production of Metals from Their Oxide Sources, p. 43-47, Feb. 2008, JOM, www.tms.org/jom.html.

Rubber & Plastics News (publication), New precipitated silica for rubber reinforcement: Part 1 of 2, Goliath Business News, http://goliath.ecnext.com/coms2/gi_0199-6497043 1New-precipitated-silica-for-rubber.html, Nov. 5, 2009.

Wikipedia, Bayer process, http://en.wikipedia.org/wiki/Bayer_process, of current date.

Wikipedia, Magnesium chloride, http://en.wikipedia.org/wiki/Magnesium_chloride, of current date.

Wikipedia, Pidgeon process, http://en.wikipedia.org/wiki/Pidgeon_process, of current date.

Wikipedia, Silicon, http://en.wikipedia.org/wiki/Silicon, of current date.

Wynnyckyj, et al., The Mechanism of Reduction of Silica by Magnesium Vapor, High Temperature Science 8, 203-217 (1976), Department of Chemical Engineering, University of Waterloo, Waterloo, Ontario, Canada.

PCT/US2009/054889 International Search Report and the Written Opinion, dated Jul. 20, 2010.

Hussain et al., 6001 Chemical Abstracts, 113 Oct. 29, 1990, No. 18, Columbus, OH, Abstract.

* cited by examiner

MAGNESIOTHERMIC METHODS OF PRODUCING HIGH-PURITY SILICON

CROSS-REFERENCE TO RELATED APPLICATIONS

This application claims the benefit of U.S. Provisional Application No. 61/189,991, filed Aug. 25, 2008, Provisional Application No. 61/098,955, filed Sep. 22, 2008, Provisional Application No. 61/105,836, filed Oct. 16, 2008, Provisional Application No. 61/117,268, filed Nov. 24, 2008, Provisional Application No. 61/119,089, filed Dec. 2, 2008, Provisional Application No. 61/121,634, filed Dec. 11, 2008, Provisional Application No. 61/160,856, filed Mar. 17, 2009, Provisional Application No. 61/175,549, filed May 5, 2009, Provisional Application No. 61/186,930, filed Jun. 15, 2009, and Provisional Application No. 61/229,456, filed Jul. 29, 2009, the disclosures of which are incorporated herein by reference.

BACKGROUND OF THE INVENTION

Current methods of manufacturing solar-grade silicon (SoG-Si) can be divided into three broad categories: the Siemens process and its variants, fluidized-bed (FB) technologies, and Upgraded Metallurgical-Grade silicon (UMG-Si) routes.

The Siemens Process

Today, most of the high-purity polycrystalline silicon ("polysilicon") manufactured around the world is produced by the Siemens process, a CVD (chemical vapor deposition) technology named for the company that developed it. In the first step of the process, metallurgical-grade (MG) silicon of ~99% purity is reacted with hydrogen chloride, HCl, at approximately 315° C. and 35 bars (~500 psi) to form a mixture of volatile chlorosilanes. Trichlorosilane, $SiHCl_3$, is obtained from the mix by distillation, and is subsequently introduced with excess hydrogen into a bell-jar reactor that contains pure silicon filaments, which are heated to ~1350° C. At this temperature, and a total gas pressure of a few bars, high-purity silicon deposits on the filaments to form rods. The role of hydrogen is to prevent homogeneous nucleation of silicon, which otherwise would create dust in the reactor. An alternative to decomposition of $SiHCl_3$ is pyrolysis of monosilane (gas), $SiH_4$, which is less energy intensive because the Si deposition temperature is about two-thirds that of trichlorosilane. However, partly because it is pyrophoric, monosilane is more difficult to process.

The polysilicon rods formed by the Siemens process are fragmented, melted, and casted into ingots using either the Czochralski process or the Bridgman method. In the former, a seed crystal is introduced into the melt and slowly withdrawn to produce a single crystal or ingot that can be several inches in diameter and several feet long. In the Bridgman method, molten silicon is fed into the top of a disposable vessel, where it flows downward and crystallizes as it cools.

Fluidized-Bed Technologies

The Siemens process is very energy intensive and, therefore, quite expensive. Consequently, in recent years, increased attention has been given to developing alternative silicon-production methods that use less energy. These include fluidized-bed (FB) technologies and UMG-Si routes (see below).

In a typical FB process, silicon deposition takes place at ~1 bar gas pressure in a vertical reactor. Pure silicon seed granules of about 100-μm dia. are introduced into the top of the reactor, and silicon-bearing gas is injected upward from the bottom. As the granules grow and gain weight, they gradually descend and are removed from the bottom of the reactor. Significantly, these silicon "beads," which are approximately 1 mm in diameter, can be harvested continuously without shutting down the reactor. In addition, the beads can be processed more readily than the silicon rods produced by the Siemens process.

Fluidized-bed technologies use less energy than the Siemens process because, first, the reactor is much smaller, and second, the flowing gas is heated, which results in higher efficiency. In a Siemens reactor, by contrast, only the filaments/rods are heated (electrically), while the reactor wall is kept cool to prevent homogeneous nucleation of silicon.

UMG-Si Routes

UMG-Si production routes are economically attractive because they avoid the high costs of gas-phase processing. Instead, they use conventional metals-processing techniques—slag treatment, leaching and solidification—to purify MG silicon. The main aim is to manufacture silicon that is just pure enough for solar-PV applications.

SUMMARY OF THE INVENTION

Magnesiothermic methods of producing solid silicon are provided. In a first embodiment, solid silica and magnesium gas are reacted at a temperature from about 400° C. to about 1000° C. to produce solid silicon and solid magnesium oxide by the reaction $SiO_2(s)+2Mg(g) \rightarrow Si(s)+2MgO(s)$ (s=solid, g=gas, l=liquid). The solid silicon has a purity from 98.0 to 99.9999%. The solid silicon is separated from the solid magnesium oxide using an electrostatic technology.

In a second embodiment, solid silica and magnesium gas are reacted at a temperature from about 400° C. to about 1000° C. to produce solid silicon and solid magnesium oxide by the reaction $SiO_2(s)+2Mg(g) \rightarrow Si(s)+2MgO(s)$, the solid silicon having a purity from 98.0 to 99.9999%. The solid silicon is then reacted with additional magnesium gas to produce solid magnesium silicide by the reaction $Si(s)+2Mg(g) \rightarrow Mg_2Si(s)$. The solid magnesium silicide is contacted with one of hydrogen chloride gas and hydrochloric acid to produce silane gas. The silane gas is thermally decomposed at a temperature above 350° C. to produce solid silicon and hydrogen gas by the reaction $SiH_4(g) \rightarrow Si(s)+2H_2(g)$, the solid silicon having a purity of at least 99.9999%. The solid silicon and hydrogen gas are separated into two processing streams. The hydrogen gas is recycled for reaction with chlorine gas to produce hydrogen chloride gas.

Various aspects of this invention will become apparent to those skilled in the art from the following detailed description of the preferred embodiment, when read in light of the accompanying drawings.

Notation: aq=aqueous, liq=liquid, g=gas, x=the variable (0<x<2) number of waters of hydration attached to the molecules of molten $MgCl_2$.

Figure 4:
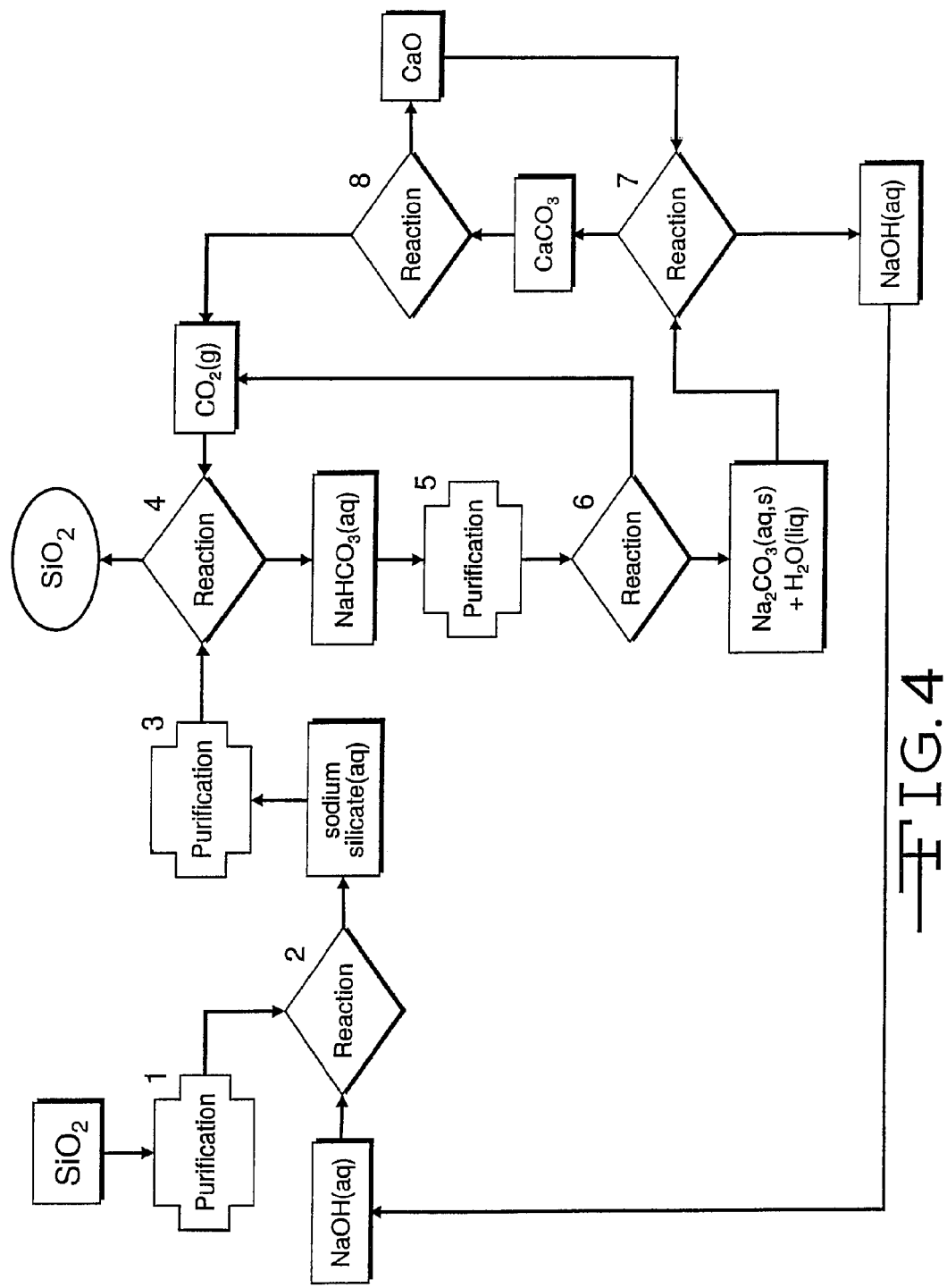

FIG. 4 is a simplified flow chart for a process that converts an impure natural or synthetic silica to a synthetic amorphous, cryptocrystalline, microcrystalline or macrocrystalline silica of higher purity. Materials in rectangles and ovals are solids unless indicated otherwise. Notation: aq=aqueous, s=solid, liq=liquid, g=gas.

DETAILED DESCRIPTION OF THE PREFERRED EMBODIMENT

A magnesiothermic method of producing high-purity solid silicon is provided. The term "magnesiothermic" means that the method includes reaction with magnesium at elevated temperatures. The method includes two embodiments, the first being capable of producing silicon having a purity of up to "five nines plus" (5N+=≧99.999% pure), and the second being capable of producing silicon having a purity of up to "eight nines plus" (8N+=≧99.999999% pure). In certain embodiments, the produced silicon is solar-grade silicon (SoG-Si). The following description often refers to solar-grade silicon as the product, but the product can by any type of silicon having the described purity.

Figure 1:
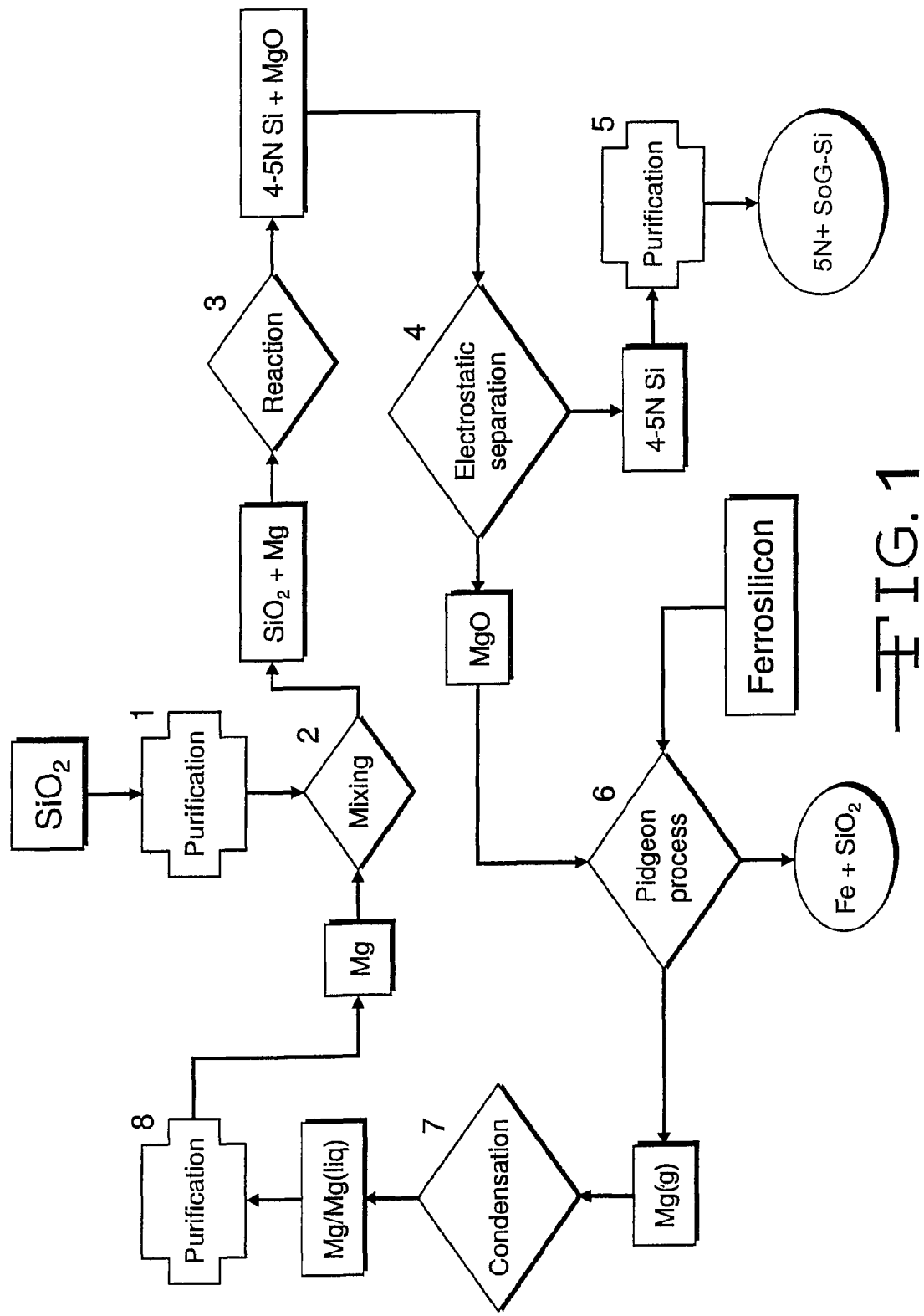
FIG. 1 is a simplified flow chart for the production of 5N+ SoG-Si using the Pidgeon process to recover Mg. Materials in rectangles and ovals are solids unless indicated otherwise. Notation: liq=liquid, g=gas.
Figure 2:
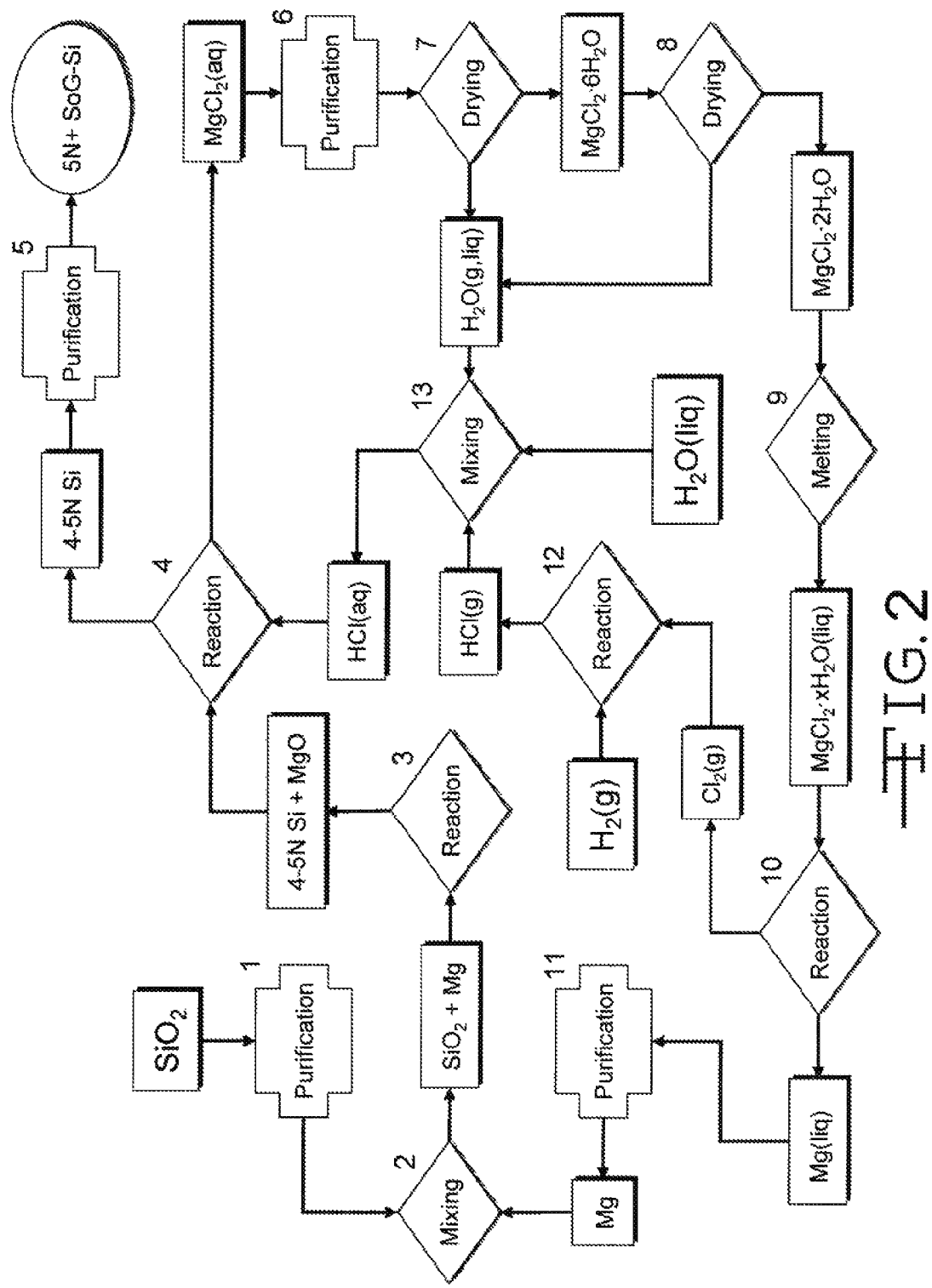
FIG. 2 is a simplified flow chart for the production of 5N+ SoG-Si using the Dow process to recover Mg. Materials in rectangles and ovals are solids unless indicated otherwise. Notation: aq=aqueous, liq=liquid, g=gas, x=the variable (0<x<2) number of waters of hydration attached to the molecules of molten $MgCl_2$.
Figure 3:
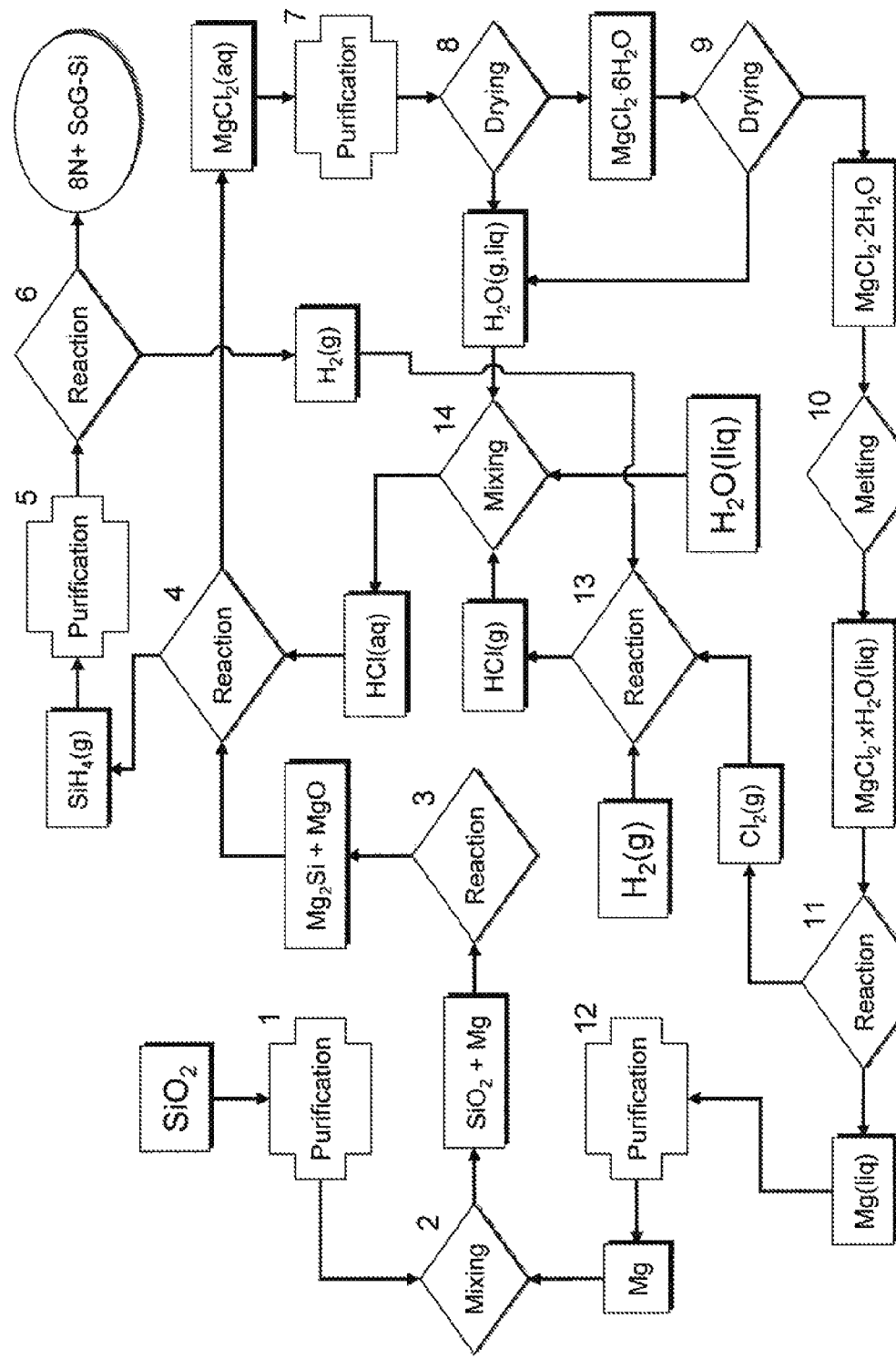
FIG. 3 is a simplified flow chart for the production of 8N+ SoG-Si using the Dow process to recover Mg. Materials in rectangles and ovals are solids unless indicated otherwise.

The embodiments of the magnesiothermic method are shown in FIGS. 1-3. These figures are described in more detail below. Both embodiments use magnesium to "strip" oxygen from $SiO_2$ by the reaction

(1)

(s=solid, g=gas, liq=liquid, Mg=magnesium, and MgO=magnesium oxide).

[Notes: (i) The numbers above the chemical species in Reaction 1 are mass-balance figures for the production of one unit mass (here, one kilogram) of Si. (ii) The reaction is conducted at a temperature, or over a range of temperatures, within a range from about 400° C. to about 1000° C. When solid magnesium is heated to near-liquidus or hyperliquidus temperatures (magnesium melts at ~650° C. at 1 bar), it starts to vaporize. The resulting magnesium gas is much more reactive than solid or liquid magnesium and, as a result, it is mainly or solely magnesium gas, formed from granular or molten magnesium, that reacts with $SiO_2$ to form Si+MgO. However, magnesium liquid may also be present and react with the silica. (iii) After Reaction 1 has gone to completion, the intimately intermixed, granular Si and MgO can be cooled to room temperature and quantitatively separated using an electrostatic technology (FIG. 1).]

In the first embodiment of the magnesiothermic method (FIGS. 1 and 2), the purity (5N+) of the SoG-Si is determined: first, by the kinds and amounts of trace elements that are present in the two reactants (granular $SiO_2$ and gaseous/liquid Mg); second, by the partitioning (subdivision) of the "released" trace elements that occurs as Reaction 1 proceeds; and third, by the extent to which the produced 4-5N Si is further purified by directional solidification during ingot casting.

In the second embodiment of the magnesiothermic method (FIG. 3), the following additional steps are taken to produce 8N+SoG-Si. First, the 4-5N Si produced by Reaction 1 is converted to solid magnesium silicide, $Mg_2Si(s)$, by reacting the silica with magnesium gas, and sometimes also magnesium liquid, by the reaction

(2)

Next, the $Mg_2Si(s)$ formed by Reaction 2 is brought into contact with hydrogen chloride gas, and/or gaseous or liquid hydrochloric acid, at any suitable temperature(s) (e.g., 80-300° C.) to produce silane gas, $SiH_4(g)$. In certain embodiments, the reaction also produces solid anhydrous magnesium chloride, $MgCl_2(s)$, or solid partially hydrated magnesium chloride, $MgCl_2 \cdot xH_2O(s)$, or aqueous magnesium chloride, $MgCl_2(aq)$, by the generalized reaction

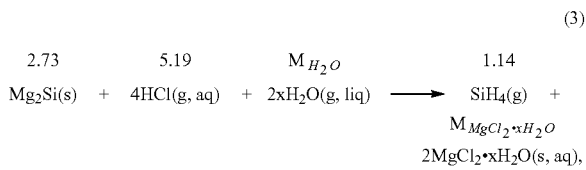

(3)

where aq=aqueous, $M_{H_2O}$=the mass (kilograms) of consumed $H_2O$, $M_{MgCl_2 \cdot H_2O}$=the mass (kilograms) of produced $MgCl_2 \cdot xH_2O$, and x=a variable.

The $SiH_4(g)$ formed in Reaction 3 is thermally decomposed at a temperature, or over a range of temperatures, above ~350° C. to produce 8N+ SoG-Si and hydrogen gas ($H_2$) by the reaction

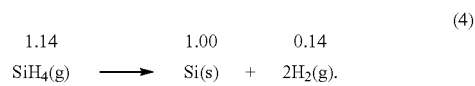

(4)

The solid silicon and hydrogen gas are separated into two processing streams. The hydrogen gas is recycled for reaction with chlorine gas to produce hydrogen chloride gas. However, in one embodiment the hydrogen gas is used for a different purpose, and not recycled for reaction with chlorine gas.

FIGS. 1-3 included herein show particular nonlimiting embodiments or examples of the above-described methods for producing high-purity silicon.

In one embodiment, FIG. 1 is a simplified flow chart showing generalized processing stages for a manufacturing method, hereinbelow "SoG-Si Manufacturing Method 1A," that converts solid silica, $SiO_2(s)$ (s=solid), to solid silicon, Si(s), the latter being at least 99.999% pure (5N+) and suitable for use as solar-grade silicon (SoG-Si).

In an optional first processing stage (1) in SoG-Si Manufacturing Method 1A, the primary feedstock, $SiO_2(s)$, is purified in any suitable manner. For example, it can be purified using a liquid that dissolves or otherwise removes impurities from the $SiO_2(s)$. The $SiO_2(s)$ can be in any form suitable for use in the process. In certain embodiments, the $SiO_2(s)$ is very fine-grained; for example, the mean diameter of the grains is between 50 and 100 microns, or between 10 and 50 microns, or between 1 and 10 microns, or is less than 1 micron—although more coarse grain sizes, greater than 100 microns, may be used in other embodiments. The $SiO_2(s)$ may be natural or synthetic, and it may be amorphous or crystalline, for example, cryptocrystalline, microcrystalline or macrocrystalline. The impurities in the $SiO_2(s)$ may be: (i) one or more elements that are structurally bound in the $SiO_2(s)$; (ii) solid material of any kind that is adsorbed onto the surfaces of individual grains of the $SiO_2(s)$; (iii) discrete grains of solid material, of any kind, that contains an element, or elements, other than silicon and oxygen; or (iv) any other impurities. The liquid that removes the impurities may be an acid, a base, or any other liquid material that is effective in removing one or more impurities from the $SiO_2(s)$. For example, in certain embodiments the liquid can be a dilute solution of hydrochloric acid, a dilute solution of sulfur acid, or a mixture of hydrochloric and sulfuric acid. The purification can be done using any suitable processing equipment and conditions.

In a second processing stage (2) in SoG-Si Manufacturing Method 1A, the $SiO_2(s)$ optionally purified in stage 1 is mixed with magnesium metal, $Mg(s)$. The magnesium metal can be in any form suitable for use in processing. In certain embodiments, the magnesium metal is particulate in form, for example granular, and having any suitable grain size. The $SiO_2(s)$ and magnesium metal can be mixed by any suitable method. For example, in certain embodiments they are mechanically mixed together using any suitable mixing equipment. The $SiO_2(s)$ and $Mg(s)$ can be mixed together in any suitable amounts. In certain embodiments, the overall mass ratio of $SiO_2(s)$ to $Mg(s)$ in the resulting batch of mixed solid material is $\leq 2.14$ parts $SiO_2(s)$ to 1.73 parts $Mg(s)$. In a particular embodiment, the two solids are mixed to achieve a mass ratio of $SiO_2(s)$ to $Mg(s)$ that is approximately 2.14 parts $SiO_2(s)$ to 1.73 parts $Mg(s)$.

In a third processing stage (3) in SoG-Si Manufacturing Method 1A, the mixed $SiO_2(s)$ and $Mg(s)$ created in stage 2 is placed in a reactor and heated to a temperature that induces the reaction $SiO_2(s)+2Mg(g,liq) \rightarrow Si(s)+2MgO(s)$, where g=gas, liq=liquid, $Si(s)$=silicon that is 99.99-99.999% pure (4-5N Si), and $MgO(s)$=magnesium oxide. In certain embodiments, the silicon and magnesium oxide are in granular form, although they could be in other forms. Prior to heating, the air present in the mixed solid material is removed by any suitable method. For example, it can be removed by vacuum pumping, or by pumping a compressed "sweep gas" through the mixed solid material. In the latter circumstance, the sweep gas can be any suitable gas, such as argon, hydrogen, or a mixture of argon and hydrogen. The conversion of $SiO_2(s)+Mg(s)$ to 4-5N $Si(s)+MgO(s)$ can take place at any suitable temperature(s) for performing the reaction. In certain embodiments, the reaction will take place predominantly in the temperature range 650-800° C. (° C.=degrees centigrade).

In a fourth processing stage (4) in SoG-Si Manufacturing Method 1A, the mixed 4-5N $Si(s)$ and $MgO(s)$ produced in the third processing stage (3) are separated from each other by any suitable method. For example, they can be separated electrostatically. After separation, the 4-5N $Si(s)$ and $MgO(s)$ are treated chemically in two independent processing streams.

In a fifth processing stage (5) in SoG-Si Manufacturing Method 1A, the 4-5N $Si(s)$ produced in stage 3 is purified by any suitable method. For example, it can be melted in a caster, or some other container or device, and purified by directional solidification. This produces a multicrystalline ingot of silicon, which may be cropped after solidification. After purification, the resulting solar-grade silicon (SoG-Si) is at least 99.999% pure (5N+).

In a sixth processing stage (6) in SoG-Si Manufacturing Method 1A, the $MgO(s)$ produced in stage 3, which may be in a particulate form, is converted back to magnesium metal by any suitable process. In the embodiment shown in FIG. 1, this conversion is done by the Pidgeon process, which uses ferrosilicon, $(Fe)Si(s)$ (Fe=iron), as a chemical reductant. Conversion occurs by the generalized reaction $2MgO(s)+(Fe)Si(s) \rightarrow 2Mg(g)+Fe(s)+SiO_2(s)$. The magnesium gas released to the pore spaces of the mixed solids is removed as it forms. The co-produced $Fe(s)+SiO_2(s)$, which may be in particulate form, may be either treated as: (i) a valuable byproduct, and subsequently processed to recover either $Fe(s)$ and/or $SiO_2(s)$; or (ii) a waste material, which is subsequently transported to an off-site location for environmentally acceptable disposal.

In a seventh processing stage (7) in SoG-Si Manufacturing Method 1A, the $Mg(g)$ formed in stage 6 is converted to solid or liquid magnesium. This conversion can be done by any suitable process, such as a condensation process.

In an optional eighth processing stage (8) in SoG-Si Manufacturing Method 1A, the solid/liquid magnesium formed in stage 7 is purified by any suitable method. For example, it can be purified by vacuum distillation, or by one or more proven metallurgical methods.

In another embodiment, FIG. 2 is a simplified flow chart showing generalized processing stages for a manufacturing method, hereinbelow "SoG-Si Manufacturing Method 1B," that converts $SiO_2(s)$ to $Si(s)$, the latter being at least 99.999% pure (5N+) and suitable for use as solar-grade silicon (SoG-Si).

The first three stages in SoG-Si Manufacturing Method 1B are identical to the first three stages in SoG-Si Manufacturing Method 1A.

In a fourth processing stage (4) in SoG-Si Manufacturing Method 1B, the 4-5N $Si(s)+MgO(s)$ produced in stage 3 is mixed with hydrochloric acid, $HCl(aq)$ (aq=aqueous), to convert the granular $MgO(s)$ to aqueous magnesium chloride, $MgCl_2(aq)$, by the reaction $MgO(s)+2HCl(aq) \rightarrow MgCl_2(aq)+H_2O(liq)$ (liq=liquid). This acid treatment has minimal effects on the granular 4-5N $Si(s)$. The produced 4-5N $Si(s)$ and $MgCl_2(aq)$ are separated physically and, subsequently, treated chemically in two independent processing streams.

Another embodiment of the fourth processing stage (4) can involve: first, separating the granular 4-5N $Si(s)+MgO(s)$ electrostatically as discussed previously; second, mixing the granular $MgO(s)$ with hydrochloric acid, $HCl(aq)$, to convert the granular $MgO(s)$ to aqueous magnesium chloride, $MgCl_2(aq)$, by the reaction $MgO(s)+2HCl(aq) \rightarrow MgCl_2(aq)+H_2O(liq)$ (liq=liquid), and third, rinsing the 4-5N $Si(s)$ with dilute hydrochloric acid, $HCl(aq)$, to remove small particles of $MgO(s)$ that are attached to the 4-5N $Si(s)$.]

In a fifth processing stage (5) in SoG-Si Manufacturing Method 1B, the granular 4-5N $Si(s)$ produced in stage 3 is melted in a caster or other suitable device and purified by directional solidification. After cropping, the silicon in the resulting multicrystalline ingot is at least 99.999% pure (5N+ SoG-Si).

In an optional sixth processing stage (6) in SoG-Si Manufacturing Method 1B, the $MgCl_2(aq)$ produced in stage 4 is purified by one or more proven chemical methods.

In a seventh processing stage (7) in SoG-Si Manufacturing Method 1B, the unpurified $MgCl_2(aq)$ formed in stage 4, or the purified $MgCl_2(aq)$ formed in stage 6, is dried to the point that solid $MgCl_2.6H_2O$ (bischofite) crystallizes.

In an eighth processing stage (8) in SoG-Si Manufacturing Method 1B, water is extracted from the solid $MgCl_2.6H_2O$ that was produced in stage 7. During this drying, crystals of hydrated magnesium chloride with numbers of waters of hydration between six and two (e.g., solid $MgCl_2.4H_2O$) may form prior to crystallization of solid $MgCl_2.2H_2O$.

In a ninth processing stage (9) in SoG-Si Manufacturing Method 1B, the solid $MgCl_2.2H_2O$ formed in stage 8 is heated to approximately 700-800° C. to produce $MgCl_2.xH_2O(liq)$, where x is a number between 0 and 2.

In a tenth processing stage (10) in SoG-Si Manufacturing Method 1B, the $MgCl_2.xH_2O(liq)$ formed in stage 9 is electrolyzed at approximately 700-800° C. to produce liquid magnesium metal, Mg(liq), and chlorine gas, $Cl_2(g)$.

In an optional eleventh processing stage (11) in SoG-Si Manufacturing Method 1B, the Mg(liq) formed in stage 10 is purified either by vacuum distillation, or by one or more proven metallurgical methods.

In a twelfth processing stage (12) in SoG-Si Manufacturing Method 1B, $Cl_2(g)$ is reacted with hydrogen gas, $H_2(g)$, to produce hydrogen chloride gas, HCl(g). In many geographic locations, $H_2(g)$ can be produced efficiently and cost-effectively by steam reforming of natural gas. In places where natural gas is unavailable, $H_2(g)$ can be produced by electrolyzing water.

In a thirteenth processing stage (13) in SoG-Si Manufacturing Method 1B, the HCl(g) formed in stage 12 is mixed with water to produce HCl(aq).

In another embodiment, FIG. 3 is a simplified flow chart showing generalized processing stages for a manufacturing method, hereinbelow "SoG-Si Manufacturing Method 2," that converts $SiO_2(s)$ to Si(s), the latter being at least 99.999999% pure (8N+) and suitable for use as solar-grade silicon (SoG-Si).

The optional first stage in SoG-Si Manufacturing Method 2 is identical to the optional first stages in SoG-Si Manufacturing Methods 1A and 1B.

In a second processing stage (2) in SoG-Si Manufacturing Method 2, the fine-grained $SiO_2(s)$ optionally purified in stage 1 is mechanically mixed with granular Mg(s). The overall mass ratio of $SiO_2(s)$ to Mg(s) in the resulting batch of mixed solid material is $\leq 2.14$ parts $SiO_2(s)$ to 3.46 parts Mg(s). The goal of mechanically mixing the two solids is to achieve a mass ratio of $SiO_2(s)$ to Mg(s) that is close to 2.14 parts $SiO_2(s)$ to 3.46 parts Mg(s).

In a third processing stage (3) in SoG-Si Manufacturing Method 2, the mixed $SiO_2(s)$ and Mg(s) created in stage 2 is placed in a reactor and heated to a temperature that induces the following two successive reactions: $SiO_2(s)+2Mg(g,liq) \rightarrow Si(s)+2MgO(s)$, and $Si(s)+2Mg(g,liq) \rightarrow Mg_2Si(s)$, where Si(s)=granular silicon that is 99.99-99.999% pure (4-5N Si), and $Mg_2Si(s)$=granular magnesium silicide. Prior to heating, the air present in the mixed solid material is removed by vacuum pumping, or by pumping a compressed "sweep gas" through the mixed solid material. In the latter circumstance, the sweep gas would probably be either argon, hydrogen, or a mixture of argon and hydrogen. It is likely that conversion of $SiO_2(s)+Mg(g)$ to $Mg_2Si(s)+MgO(s)$ will take place predominantly in the temperature range 650-800° C.

In a fourth processing stage (4) in SoG-Si Manufacturing Method 2, the $Mg_2Si(s)+MgO(s)$ is mixed with HCl(aq) to produce silane gas, $SiH_4(g)$, and $MgCl_2(aq)$. The three reactions that accomplish this conversion are: $Mg_2Si(s)+4HCl(g,aq)+xH_2O(g,liq) \rightarrow SiH_4(g)+2MgCl_2.xH_2O(s,aq)$; $MgCl_2.xH_2O(s)+yH_2O(liq,g) \rightarrow MgCl_2(aq)+(x+y)H_2O(liq)$; and $MgO(s)+2HCl(aq,g) \rightarrow MgCl_2(aq)+H_2O(liq)$. After these reactions have gone to completion, or nearly so, the produced $SiH_4(g)$ and $MgCl_2(aq)$ are separated physically and, subsequently, treated chemically in two independent processing streams.

In a fifth processing stage (5) in SoG-Si Manufacturing Method 2, the $SiH_4(g)$ produced in stage 4 is separated from one or more additional gas species—e.g., HCl(g). Removal of these gas species will facilitate production of 8N+SoG-Si.

In a sixth processing stage (6) in SoG-Si Manufacturing Method 2, the $SiH_4(g)$ produced in stage 4 is thermally decomposed into its constituent elements by the reaction $SiH_4(g) \rightarrow Si(s)+2H_2(g)$. Due to the high purity of the $SiH_4(g)$, the produced Si(s) will be 99.999999% pure (8N+ SoG-Si).

Stages 7-12 in SoG-Si Manufacturing Method 2 are substantially identical to stages 6-11 in SoG-Si Manufacturing Method 1B.

In a thirteenth processing stage (13) in SoG-Si Manufacturing Method 2, $Cl_2(g)$ is reacted with $H_2(g)$ to produce HCl(g). Part of the $H_2(g)$ required for this stage is obtained from stage 6; the remaining amount is provided by an external source. In many geographic locations, an external supply of $H_2(g)$ can be produced efficiently and cost-effectively by steam reforming of natural gas. In places where natural gas is unavailable, an external supply of $H_2(g)$ can be produced by electrolyzing water. The $H_2(g)$ can be produced by any other suitable means.

Stage 14 in SoG-Si Manufacturing Method 2 is substantially identical to stage 13 in SoG-Si Manufacturing Method 1B.

FIG. 4 included herein shows a particular nonlimiting embodiment or example of a process for purifying the silica that is used as a starting material in the above-described methods for producing high-purity silicon.

In one embodiment, FIG. 4 is a simplified flow chart showing generalized processing stages for a process that converts solid silica, $SiO_2(s)$, to a new amorphous, cryptocrystalline, microcrystalline or macrocrystalline form of synthetic silica (see also Table 2).

In an optional first processing stage (1) in the silica purification process, the primary feedstock, $SiO_2(s)$, is purified in any suitable manner. For example, it can be purified using a liquid that dissolves or otherwise removes impurities from the $SiO_2(s)$. The $SiO_2(s)$ can be in any form suitable for use in the process. In certain embodiments, the $SiO_2(s)$ is very fine-grained; for example, the mean diameter of the grains is between 50 and 100 microns, or between 10 and 50 microns, or between 1 and 10 microns, or is less than 1 micron—although more coarse grain sizes, greater than 100 microns, may be used in other embodiments. The $SiO_2(s)$ may be natural or synthetic, and it may be amorphous or crystalline, for example, cryptocrystalline, microcrystalline or macrocrystalline. The impurities in the $SiO_2(s)$ may be: (i) one or more elements that are structurally bound in the $SiO_2(s)$; (ii) solid material of any kind that is adsorbed onto the surfaces of individual grains of the $SiO_2(s)$; (iii) discrete grains of solid material, of any kind, that contains an element, or elements, other than silicon and oxygen; or (iv) any other impurities. The liquid that removes the impurities may be an acid, a base, or any other liquid material that is effective in removing one or more impurities from the $SiO_2(s)$. For example, in certain embodiments, the liquid can be a dilute solution of hydrochloric acid, a dilute solution of sulfuric acid, or a mixture of hydrochloric and sulfuric acid. The purification can be done using any suitable processing equipment and conditions.

In a second processing stage (2) in the silica purification process, the silica is reacted with an aqueous solution of one or more alkali metal hydroxides to produce one or more alkali metal silicates plus water by the generalized reaction $SiO_2(s)+2yMOH(aq) \rightarrow yM_2O.SiO_2(aq)+yH_2O(liq)$
(s=solid, aq=aqueous, liq=liquid, M=alkali metal, which is Na in FIG. 4, MOH=alkali metal hydroxide, $M_2O \cdot SiO_2$=alkali metal silicate, and y=a molar factor for MOH that determines the ratio of $M_2O$ to $SiO_2$ in the resulting aqueous solution).

In a third processing stage (3) in the silica purification process, the aqueous solution of alkali silicate is purified in any suitable manner. The purification can be done using any suitable processing equipment and conditions. For example, one or more proven methods of purification may be used to remove one or more of the following elements: boron, phosphorus, aluminum, calcium, copper, iron, potassium, magnesium, sodium and titanium.

In a fourth processing stage (4) in the silica purification process, the alkali metal silicate is reacted with carbon dioxide and water to produce silica and alkali metal bicarbonate by the generalized reaction $yM_2O \cdot SiO_2(aq)+2yCO_2(g)+yH_2O(liq) \rightarrow SiO_2(s)+2yMHCO_3(aq)$ ($MHCO_3$=alkali metal bicarbonate, M=Na in FIG. 4).

In an optional fifth processing stage (5) in the silica purification process, the aqueous solution of alkali bicarbonate is purified in any suitable manner. The purification can be done using any suitable processing equipment and conditions. For example, one or more proven methods of purification may be used to remove one or more of the following elements: boron, phosphorus, aluminum, calcium, copper, iron, potassium, magnesium, sodium and titanium.

In a sixth processing stage (6) in the silica purification process, the alkali metal bicarbonate is decomposed to produce alkali metal carbonate plus carbon dioxide plus water by the generalized reaction $2yMHCO_3(aq)\ yM_2CO_3(aq,s)=yCO_2(g)+yH_2O(liq)$ ($M_2CO_3$=alkali metal carbonate, M=Na in FIG. 4).

In a seventh processing stage (7) in the silica purification process, the alkali metal carbonate is reacted with calcium oxide and water to produce calcium carbonate and alkali metal hydroxide by the generalized reaction $yM_2CO_3(aq)+yCaO(s)+yH_2O(liq) \rightarrow yCaCO_3(s)+2yMOH(aq)$ (M=Na in FIG. 4).

In an eighth processing stage (8) in the silica purification process, the calcium carbonate is decomposed to produce calcium oxide and carbon dioxide by the generalized reaction $yCaCO_3(s) \rightarrow yCaO(s)+yCO_2(g)$.

In certain embodiments of the magnesiothermic method, the solid silica starting material is a synthetic silica produced by the process described hereinbelow and shown in Tables 1-3 shown below. The combination of this synthetic silica production process with the magnesiothermic method can be advantageous in producing a silicon product of the magnesiothermic method having a desired purity.

The synthetic silica is produced by a process comprising: (a) providing alkali metal silicate; (b) reacting the alkali metal silicate with carbon dioxide and water to produce silica and alkali metal bicarbonate; and conducting one or more subsequent reactions, such that in the overall process significant amounts of at least two materials are internally consumed and regenerated in closed chemical loops. The at least two materials are selected from the carbon dioxide of the preceding reaction, the alkali metal bicarbonate of the preceding reaction, calcium oxide and alkali metal hydroxide. In certain embodiments, at least three of the materials are internally consumed and regenerated.

In certain embodiments, the alkali metal silicate of step (a) is provided by reacting a silica-bearing material with alkali metal hydroxide. Also, in certain embodiments, the alkali metal hydroxide is regenerated, from the reaction products of the above reaction, using calcium hydroxide or calcium oxide.

In certain embodiments, the above-described subsequent reactions include a reaction that decomposes the alkali metal bicarbonate into alkali metal carbonate, carbon dioxide and water. Also, in certain embodiments, this carbon dioxide is internally consumed and regenerated in the process. In other embodiments, the carbon dioxide consumed in step (b) is regenerated in two separate subsequent reactions.

Further, in certain embodiments of this synthetic silica production process, there is substantially no net production or consumption of any material that contains hydrogen, alkali metal, carbon or calcium; and the net processing reaction is conversion of a silica-bearing material to a solid silica product.

Also, in certain embodiments, one or more impurities are removed from at least one of: alkali metal hydroxide, alkali metal silicate, silica product, alkali metal bicarbonate, and alkali metal carbonate. More particularly, the impurities may include one or more of the following elements: boron, phosphorous, aluminum, calcium, copper, iron, potassium, magnesium, sodium and titanium.

Tables 1-3 included hereinbelow show particular nonlimiting embodiments or examples of processes for purifying silica that can be used as the starting material in the magnesiothermic methods of producing high-purity silicon. In all of the tables, "y" is either a constant with a value between 0.5 and 2.0, or a variable with two or more values that range between 0.5 and 2.0.

TABLE 1

Generalized process reactions and mass-balance terms for a four-stage conversion of natural or synthetic silica, $SiO_2$, to synthetic amorphous, cryptocrystalline, microcrystalline or macrocrystalline $SiO_2$[1,2,3]

| [1] | [2] | [3] | [4] | (1) |
|---|---|---|---|---|
| $SiO_2(s)$ + | $2yNaOH(aq)$ | $\rightarrow$ $yNa_2O \cdot SiO_2(aq)$ + | $yH_2O(liq)$ | |

| [5] | [6] | [7] | [8] | [9] | (2) |
|---|---|---|---|---|---|
| $yNa_2O \cdot SiO_2(aq)$ + | $2yCO_2(g)$ + | $yH_2O(liq)$ $\rightarrow$ | $SiO_2(s)$ + | $2yNaHCO_3(aq)$ | |

| [10] | [11] | [12] | [13] | (3) |
|---|---|---|---|---|
| $2yNaHCO_3(aq)$ + | $2yCaO(s)$ $\rightarrow$ | $2yCaCO_3(s)$ + | $2yNaOH(aq)$ | |

| [14] | [15] | [16] | (4) |
|---|---|---|---|
| $2yCaCO_3(s)$ $\rightarrow$ | $2yCaO(s)$ + | $2yCO_2(g)$ | |

TABLE 1-continued

Generalized process reactions and mass-balance terms for a four-stage conversion of natural or synthetic silica, $SiO_2$, to synthetic amorphous, cryptocrystalline, microcrystalline or macrocrystalline $SiO_2$[1,2,3]

$$[17] \quad [18] \quad \quad \quad \quad \quad \quad \quad \quad \quad \quad \quad \quad \quad \quad (5)$$
$$SiO_2(s) \longrightarrow SiO_2(s)$$

[1] In Reactions 1-5, s = solid, aq = aqueous, liq = liquid, g = gas, and y = a molar factor for NaOH that determines the molar ratio of $Na_2O$ to $SiO_2$ in the aqueous liquid produced by Reaction 1, assuming that it goes to completion.
[2] Reaction 5, obtained by summing Reactions 1-4, is the net caustic conversion reaction for silica, which is conversion of that silicate to a new amorphous, cryptocrystalline, microcrystalline or macrocrystalline form of synthetic silica.
[3] The numbers in square brackets above the species in Reactions 1-5 represent the mass-balance terms defined below, wherein: $n_{SiO_2}$ = the number of gram moles of $SiO_2$ in a unit mass (e.g., one metric ton) of silica; and $MW_i$ = the molecular weight of species/component i.
[1] $n_{SiO_2} \cdot MW_{SiO_2}$ [2] $2y \cdot n_{SiO_2} \cdot MW_{NaOH}$ [3] $n_{SiO_2} \cdot (y \cdot MW_{Na_2O} + MW_{SiO_2})$ [4] $y \cdot n_{SiO_2} \cdot MW_{H_2O}$
[5] $n_{SiO_2} \cdot (y \cdot MW_{Na_2O} + MW_{SiO_2})$ [6] $2y \cdot n_{SiO_2} \cdot MW_{CO_2}$ [7] $y \cdot n_{SiO_2} \cdot MW_{H_2O}$ [8] $n_{SiO_2} \cdot MW_{SiO_2}$
[9] $2y \cdot n_{SiO_2} \cdot MW_{NaHCO_3}$ [10] $2y \cdot n_{SiO_2} \cdot MW_{NaHCO_3}$ [11] $2y \cdot n_{SiO_2} \cdot MW_{CaO}$ [12] $2y \cdot n_{SiO_2} \cdot MW_{CaCO_3}$
[13] $2y \cdot n_{SiO_2} \cdot MW_{NaOH}$ [14] $2y \cdot n_{SiO_2} \cdot MW_{CaCO_3}$ [15] $2y \cdot n_{SiO_2} \cdot MW_{CaO}$ [16] $2y \cdot n_{SiO_2} \cdot MW_{CO_2}$
[17] $n_{SiO_2} \cdot MW_{SiO_2}$ [18] $n_{SiO_2} \cdot NW_{SiO_2}$ In one embodiment, Table 1 shows generalized process reactions and mass-balance terms for a four-stage conversion of one form of silica to a different form of synthetic silica. In a first stage (1), one or more forms of silica, or the silica in one or more silica-bearing source materials, is reacted with an aqueous solution of one or more alkali metal hydroxides to produce one or more alkali metal silicates plus water by the generalized reaction $SiO_2(s)+2yMOH(aq) \rightarrow yM_2O \cdot SiO_2(aq)+yH_2O(liq)$ (s=solid, aq=aqueous, liq=liquid, M=alkali metal, which is Na in the illustrated embodiment, MOH=alkali metal hydroxide, $M_2O \cdot SiO_2$=alkali metal silicate, and y=a molar factor for MOH that determines the ratio of $M_2O$ to $SiO_2$ in the resulting aqueous solution). In a second stage (2), the alkali metal silicate is reacted with carbon dioxide and water to produce silica and alkali metal bicarbonate by the generalized reaction $yM_2O \cdot SiO_2(aq)+2yCO_2(g)+yH_2O(liq) \rightarrow SiO_2(s)+2yMHCO_3(aq)$ ($MHCO_3$=alkali metal bicarbonate). In a third stage (3), the alkali metal bicarbonate is reacted with calcium oxide to produce calcium carbonate and alkali metal hydroxide by the generalized reaction $2yMHCO_3(aq)+2yCaO(s) \rightarrow 2yCaCO_3(s)+2yMOH(aq)$. In a fourth and final stage (4), the calcium carbonate is decomposed to produce calcium oxide and carbon dioxide by the generalized reaction $2yCaCO_3(s) \rightarrow 2yCaO(s)+2yCO_2(g)$.

TABLE 2

Generalized process reactions and mass-balance terms for a five-stage conversion of natural or synthetic silica, $SiO_2$, to synthetic amorphous, cryptocrystalline, microcrystalline or macrocrystalline $SiO_2$[1,2,3]

$$[1] \quad [2] \quad \quad \quad [3] \quad \quad \quad [4] \quad \quad \quad \quad (6)$$
$$SiO_2(s) + 2yNaOH(aq) \longrightarrow yNa_2O \cdot SiO_2(aq) + yH_2O(liq)$$

$$[5] \quad \quad \quad [6] \quad \quad [7] \quad \quad \quad [8] \quad \quad [9] \quad (7)$$
$$yNa_2O \cdot SiO_2(aq) + 2yCO_2(g) + yH_2O(liq) \longrightarrow SiO_2(s) + 2yNaHCO_3(aq)$$

$$[10] \quad \quad \quad [11] \quad \quad \quad [12] \quad \quad [13] \quad (8)$$
$$2yNaHCO_3(aq) \longrightarrow yNa_2CO_3(aq, s) + yCO_2(g) + yH_2O(liq)$$

$$[14] \quad \quad [15] \quad \quad [16] \quad \quad \quad [17] \quad \quad [18] \quad (9)$$
$$yNa_2CO_3(aq) + yCaO(s) + yH_2O(liq) \longrightarrow yCaCO_3(s) + 2yNaOH(aq)$$

$$[19] \quad \quad [20] \quad \quad [21] \quad \quad \quad \quad (10)$$
$$yCaCO_3(s) \longrightarrow yCaO(s) + yCO_2(g)$$

$$[22] \quad [23] \quad \quad \quad \quad \quad \quad \quad \quad \quad (11)$$
$$SiO_2(s) \longrightarrow SiO_2(s)$$

[1] In Reactions 6-11, s = solid, aq = aqueous, liq = liquid, g = gas, and y = a molar factor for NaOH that determines the molar ratio of $Na_2O$ to $SiO_2$ in the aqueous liquid produced by Reaction 6, assuming that it goes to completion.
[2] Reaction 11, obtained by summing Reactions 6-10, is the net caustic conversion reaction for silica, which is conversion of that silicate to a new amorphous, cryptocrystalline, microcrystalline or macrocrystalline form of synthetic silica.
[3] The numbers in square brackets above the species in Reactions 6-11 represent the mass-balance terms defined below, wherein: $n_{SiO_2}$ = the number of gram moles of $SiO_2$ in a unit mass (e.g., one metric ton) of silica; and $MW_i$ = the molecular weight of species/component i.
[1] $n_{SiO_2} \cdot MW_{SiO_2}$ [2] $2y \cdot n_{SiO_2} \cdot MW_{NaOH}$ [3] $n_{SiO_2} \cdot (y \cdot MW_{Na_2O} + MW_{SiO_2})$ [4] $y \cdot n_{SiO_2} \cdot MW_{H_2O}$
[5] $n_{SiO_2} \cdot (y \cdot MW_{Na_2O} + MW_{SiO_2})$ [6] $2y \cdot n_{SiO_2} \cdot MW_{CO_2}$ [7] $y \cdot n_{SiO_2} \cdot MW_{H_2O}$ [8] $n_{SiO_2} \cdot MW_{SiO_2}$
[9] $2y \cdot n_{SiO_2} \cdot MW_{NaHCO_3}$ [10] $2y \cdot n_{SiO_2} \cdot MW_{NaHCO_3}$ [11] $y \cdot n_{SiO_2} \cdot MW_{Na_2CO_3}$ [12] $y \cdot n_{SiO_2} \cdot MW_{CO_2}$
[13] $y \cdot n_{SiO_2} \cdot MW_{H_2O}$ [14] $y \cdot n_{SiO_2} \cdot MW_{Na_2CO_3}$ [15] $y \cdot n_{SiO_2} \cdot MW_{CaO}$ [16] $y \cdot n_{SiO_2} \cdot MW_{H_2O}$
[17] $y \cdot n_{SiO_2} \cdot MW_{CaCO_3}$ [18] $2y \cdot n_{SiO_2} \cdot MW_{NaOH}$ [19] $y \cdot n_{SiO_2} \cdot MW_{CaCO_3}$ [20] $y \cdot n_{SiO_2} \cdot MW_{CaO}$
[21] $y \cdot n_{SiO_2} \cdot MW_{CO_2}$ [22] $n_{SiO_2} \cdot MW_{SiO_2}$ [23] $n_{SiO_2} \cdot MW_{SiO_2}$ In another embodiment, Table 2 shows generalized process reactions and mass-balance terms for a five-stage conversion of one form of silica to a different form of synthetic silica. The first two stages (6) and (7) of the process are substantially the same as stages (1) and (2) in Table 1. In a third stage (8), the alkali metal bicarbonate is decomposed to produce alkali metal carbonate plus carbon dioxide plus water by the generalized reaction $2yMHCO_3(aq) \rightarrow yM_2CO_3(aq,s) + yCO_2(g) + yH_2O(liq)$ ($M_2CO_3$=alkali metal carbonate, M=Na in the illustrated embodiment). In a fourth stage (9), the alkali metal carbonate is reacted with calcium oxide and water to produce calcium carbonate and alkali metal hydroxide by the generalized reaction $yM_2CO_3(aq)+yCaO(s)+yH_2O(liq) \rightarrow yCaCO_3(s)+2yMOH(aq)$. In a fifth and final stage (10), the calcium carbonate is decomposed to produce calcium oxide and carbon dioxide by the generalized reaction $yCaCO_3(s) \rightarrow yCaO(s)+yCO_2(g)$.

reactions in which a silica-bearing material is converted to silica, the process including the use of alkali metal-bearing material, carbon-bearing material and calcium-bearing material as reactants, and the process including closed loops that internally consume and regenerate these reactants, so that, in the ideal limit, the overall process has substantially no net production or consumption of these reactants.

In another embodiment, the above-described is a process of producing silica comprising chemical reactions in which a silica-bearing material is converted to silica, the process including a reaction that produces alkali metal bicarbonate,

TABLE 3

Generalized process reactions and mass-balance terms for a six-stage conversion of natural or synthetic silica, $SiO_2$, to synthetic amorphous, cryptocrystalline, microcrystalline or macrocrystalline $SiO_2^{1,2,3}$

| | | | | | |
|---|---|---|---|---|---|
| [1] | [2] | [3] | [4] | | (12) |
| $SiO_2(s)$ + | $2yNaOH(aq)$ | $\rightarrow$ | $yNa_2O \cdot SiO_2(aq)$ + | $yH_2O(liq)$ | |
| [5] | [6] | [7] | [8] | [9] | (13) |
| $yNa_2O \cdot SiO_2(aq)$ + | $2yCO_2(g)$ + | $yH_2O(liq)$ | $\rightarrow$ | $SiO_2(s)$ + $2yNaHCO_3(aq)$ | |
| [10] | [11] | [12] | [13] | | (14) |
| $2yNaHCO_3(aq)$ | $\rightarrow$ | $yNa_2CO_3(aq,s)$ + | $yCO_2(g)$ + $yH_2O(liq)$ | | |
| [14] | [15] | [16] | [17] | | (15) |
| $yNa_2CO_3(aq)$ + | $yCa(OH)_2(s)$ | $\rightarrow$ | $yCaCO_3(s)$ + | $2yNaOH(aq)$ | |
| [18] | [19] | [20] | | | (16) |
| $yCaCO_3(s)$ | $\rightarrow$ | $yCaO(s)$ + $yCO_2(g)$ | | | |
| [21] | [22] | [23] | | | (17) |
| $yCaO(s)$ + | $yH_2O(liq)$ | $\rightarrow$ $yCa(OH)_2(s)$ | | | |
| [24] | [25] | | | | (18) |
| $SiO_2(s)$ | $\rightarrow$ $SiO_2(s)$ | | | | |

[1] In Reactions 12-18, s = solid, aq = aqueous, liq = liquid, g = gas, and y = a molar factor for NaOH that determines the molar ratio of $Na_2O$ to $SiO_2$ in the aqueous liquid produced by Reaction 12, assuming that it goes to completion.
[2] Reaction 18, obtained by summing Reactions 12-17, is the net caustic conversion reaction for silica, which is conversion of that silicate to a new amorphous, cryptocrystalline, microcrystalline or macrocrystalline form of synthetic silica.
[3] The numbers in square brackets above the species in Reactions 12-18 represent the mass-balance terms defined below, wherein: $n_{SiO_2}$ = the number of gram moles of $SiO_2$ in a unit mass (e.g., one metric ton) of silica; and $MW_i$ = the molecular weight of species/component i.
[1] $n_{SiO_2} \cdot MW_{SiO_2}$ [2] $2y \cdot n_{SiO_2} \cdot MW_{NaOH}$ [3] $n_{SiO_2} \cdot (y \cdot MW_{Na_2O} + MW_{SiO_2})$ [4] $y \cdot n_{SiO_2} \cdot MW_{H_2O}$
[5] $n_{SiO_2} \cdot (y \cdot MW_{Na_2O} + MW_{SiO_2})$ [6] $2y \cdot n_{SiO_2} \cdot MW_{CO_2}$ [7] $y \cdot n_{SiO_2} \cdot MW_{H_2O}$ [8] $n_{SiO_2} \cdot MW_{SiO_2}$
[9] $2y \cdot n_{SiO_2} \cdot MW_{NaHCO_3}$ [10] $2y \cdot n_{SiO_2} \cdot MW_{NaHCO_3}$ [11] $y \cdot n_{SiO_2} \cdot MW_{Na_2CO_3}$ [12] $y \cdot n_{SiO_2} \cdot MW_{CO_2}$
[13] $y \cdot n_{SiO_2} \cdot MW_{H_2O}$ [14] $y \cdot n_{SiO_2} \cdot MW_{Na_2CO_3}$ [15] $y \cdot n_{SiO_2} \cdot MW_{Ca(OH)_2}$ [16] $y \cdot n_{SiO_2} \cdot MW_{CaCO_3}$
[17] $2y \cdot n_{SiO_2} \cdot MW_{NaOH}$ [18] $y \cdot n_{SiO_2} \cdot MW_{CaCO_3}$ [19] $y \cdot n_{SiO_2} \cdot MW_{CaO}$ [20] $y \cdot n_{SiO_2} \cdot MW_{CO_2}$
[21] $y \cdot n_{SiO_2} \cdot MW_{CaO}$ [22] $y \cdot n_{SiO_2} \cdot MW_{H_2O}$ [23] $y \cdot n_{SiO_2} \cdot MW_{Ca(OH)_2}$ [24] $n_{SiO_2} \cdot MW_{SiO_2}$
[25] $n_{SiO_2} \cdot MW_{SiO_2}$ In another embodiment, Table 3 shows generalized process reactions and mass-balance terms for a six-stage conversion of one form of silica to a different form of synthetic silica. The first three stages (12), (13) and (14) of the process are substantially the same as stages (6), (7) and (8) in Table 2. In a fourth stage (15), the alkali metal carbonate material is reacted with calcium hydroxide to produce calcium carbonate and alkali metal hydroxide by the generalized reaction $yM_2CO_3(aq)+yCa(OH)_2(s) \rightarrow yCaCO_3(s)+2yMOH(aq)$ (M=Na in the illustrated embodiment). In a fifth stage (16), the calcium carbonate is decomposed to produce calcium oxide and carbon dioxide by the generalized reaction $yCaCO_3(s) \rightarrow yCaO(s)+yCO_2(g)$. In a sixth and final stage (17), the calcium oxide is reacted with water to produce calcium hydroxide by the generalized reaction $yCaO(s)+yH_2O(liq) \rightarrow yCa(OH)_2(s)$.

More generally, in a certain embodiment, the above-described is a process of producing silica comprising chemical and the process including a subsequent reaction that decomposes the alkali metal bicarbonate into alkali metal carbonate, carbon dioxide and water.

In a further embodiment, the above-described is a process of producing silica comprising chemical reactions in which a silica-bearing material is converted to silica, the process including a reaction that produces alkali metal bicarbonate, the process further including one or more reactions that consume the produced alkali metal bicarbonate, and the overall process having substantially no net production or consumption of materials, The principle and mode of operation of this invention have been explained and illustrated in its preferred embodiment. However, it must be understood that this invention may be practiced otherwise than as specifically explained and illustrated without departing from its spirit or scope.

What is claimed is:

1. A magnesiothermic method of producing solid silicon comprising:
    (a) reacting solid silica and magnesium gas at a temperature within a range from about 400° C. to about 1000° C. to produce solid silicon and solid magnesium oxide by the reaction $SiO_2(s)+2Mg(g) \rightarrow Si(s)+2MgO(s)$, the solid silicon having a purity within a range from 98.0 to 99.9999%;
    (b) reacting the solid silicon with magnesium gas to produce solid magnesium silicide by the reaction $Si(s)+2Mg(g) \rightarrow Mg_2Si(s)$;
    (c) contacting the solid magnesium silicide with at least one of hydrogen chloride gas and hydrochloric acid to produce silane gas;
    (d) thermally decomposing the silane gas at a temperature above 350° C. to produce solid silicon and hydrogen gas by the reaction $SiH_4(g) \rightarrow Si(s)+2H_2(g)$, the solid silicon having a purity of at least 99.9999%;
    (e) separating the solid silicon and hydrogen gas into two processing streams; and
    (f) recycling the hydrogen gas for reaction with chlorine gas to produce hydrogen chloride gas.

2. The magnesiothermic method of claim 1 wherein step (c) comprises contacting the solid magnesium silicide with at least one of (i) hydrogen chloride gas and (ii) hydrochloric acid in gaseous form, liquid form, or both gaseous form and liquid form to produce silane gas and solid, anhydrous magnesium chloride, $MgCl_2(s)$, or solid partially or fully hydrated magnesium chloride, $MgCl_2.xH_2O(s)$, where x is a number between 0 and 6, or aqueous magnesium chloride, $MgCl_2$ (aq), by the generalized reaction $Mg_2Si(s)+4HCl(g,aq)+2xH_2O(g,liq) \rightarrow SiH_4(g)+2MgCl_2.xH_2O(s,aq)$.

3. The magnesiothermic method of claim 2 wherein step (c) produces solid partially hydrated magnesium chloride.

4. The magnesiothermic method of claim 1 additionally comprising separating the solid silicon from the solid magnesium oxide produced in step (a) using an electrostatic technology.

5. The magnesiothermic method of claim 1 additionally comprising purifying the source of the magnesium gas before reacting the magnesium gas with the solid silica in step (a).

6. The magnesiothermic method of claim 1 additionally comprising converting the solid magnesium oxide of step (a) to either solid, anhydrous magnesium chloride, $MgCl_2(s)$, or solid partially or fully hydrated magnesium chloride, $MgCl_2.xH_2O(s)$, or aqueous magnesium chloride, $MgCl_2$ (aq).

7. The magnesiothermic method of claim 6 additionally comprising purifying the $MgCl_2(s)$, the $MgCl_2.xH_2O(s)$, or $MgCl_2(aq)$.

8. The magnesiothermic method of claim 6 additionally comprising melting and converting the $MgCl_2(s)$ or $MgCl_2.xH_2O(s)$ to magnesium by an electrolytic technology.

9. The magnesiothermic method of claim 8 wherein the electrolytic technology includes electrolyzing the molten $MgCl_2(s)$ or the molten $MgCl_2.xH_2O(s)$ to produce chlorine gas, and reacting the chlorine gas with a hydrogen gas to produce hydrogen chloride gas.

10. The magnesiothermic method of claim 8 wherein the magnesium produced is recycled as a starting material in the magnesiothermic method.

11. The magnesiothermic method of claim 1 additionally comprising purifying the silane gas before it is thermally decomposed.

12. The magnesiothermic method of claim 1 wherein the solid silica comprises natural silica.

13. The magnesiothermic method of claim 12 additionally comprising purifying the natural solid silica with an acidic aqueous solution before reacting the solid silica with the magnesium gas in step (a).

14. The magnesiothermic method of claim 1 wherein the solid silica comprises synthetic silica.

15. The magnesiothermic method of claim 14 wherein the synthetic silica is produced by a process comprising:
    aa providing alkali metal silicate;
    bb reacting the alkali metal silicate with carbon dioxide and water to produce silica and alkali metal bicarbonate; and
    conducting one or more subsequent reactions, such that in the overall process at least two materials are internally consumed and regenerated in closed chemical loops, the at least two materials being selected from the carbon dioxide of the preceding reaction bb, the alkali metal bicarbonate of the preceding reaction bb, calcium oxide and alkali metal hydroxide.

16. The magnesiothermic method of claim 15 wherein the at least two materials includes at least three of the materials being internally consumed and regenerated and being selected from the carbon dioxide of the preceding reaction bb, the alkali metal bicarbonate of the preceding reaction bb, calcium oxide and alkali metal hydroxide.

17. The magnesiothermic method of claim 15 wherein the alkali metal silicate of step aa is provided by reacting a silica-bearing material with alkali metal hydroxide.

18. The magnesiothermic method of claim 17 wherein the alkali metal hydroxide is regenerated, from the alkali metal bicarbonate of claim 17, using calcium hydroxide or calcium oxide.

19. The magnesiothermic method of claim 15 wherein the subsequent reactions include a reaction that decomposes the alkali metal bicarbonate into alkali metal carbonate, carbon dioxide and water.

20. The magnesiothermic method of claim 19 wherein the carbon dioxide from claim 19 is internally consumed and regenerated in the process.

21. The magnesiothermic method of claim 15 wherein the carbon dioxide consumed in step bb is regenerated in two separate subsequent reactions.

22. The magnesiothermic method of claim 15 wherein: the process is carried out with substantially no net production or consumption of any material that contains hydrogen, alkali metal, carbon or calcium, and the net processing reaction is conversion of a silica-bearing material to a solid silica product.

23. The magnesiothermic method of claim 17 wherein:
    in step aa, the silica starting material is reacted with an aqueous solution of the alkali metal hydroxide to produce the alkali metal silicate plus water by the generalized reaction $SiO_2(s)+2yMOH(aq) \rightarrow yM_2O.SiO_2(aq)+yH_2O(liq)$ (where M=alkali metal, MOH=alkali metal hydroxide, $M_2O.SiO_2$=alkali metal silicate, and y=a molar factor for MOH that determines the ratio of $M_2O$ to $SiO_2$ in the resulting aqueous solution), and where y has a value between 0.5 and 2.0; and
    in step bb, the alkali metal silicate is reacted with carbon dioxide and water to produce silica and the alkali metal bicarbonate by the generalized reaction $yM_2O.SiO_2(aq)+2yCO_2(g)+yH_2O(liq) \rightarrow SiO_2(s)+2yMHCO_3(aq)$ ($MHCO_3$=alkali metal bicarbonate).

24. The magnesiothermic method of claim 23 wherein:
    in a subsequent step cc1, the alkali metal bicarbonate is reacted with calcium oxide to produce calcium carbonate and alkali metal hydroxide by the generalized reaction $2yMHCO_3(aq)+2yCaO(s) \rightarrow 2yCaCO_3(s)+2yMOH(aq)$; and in a subsequent and final step dd1, the calcium carbonate is decomposed to produce calcium oxide and carbon dioxide by the generalized reaction $2yCaCO_3(s) \rightarrow 2yCaO(s)+2yCO_2(g)$.

25. The magnesiothermic method of claim 23 wherein:

in a subsequent step cc2, the alkali metal bicarbonate is decomposed to produce an alkali metal carbonate plus carbon dioxide plus water by the generalized reaction $2yMHCO_3(aq) \rightarrow yM_2CO_3(aq,s)+yCO_2(g)+yH_2O(liq)$;

in a subsequent step dd2, the alkali metal carbonate is reacted with calcium oxide and water to produce calcium carbonate and alkali metal hydroxide by the generalized reaction $yM_2CO_3(aq)+yCaO(s)+yH_2O(liq) \rightarrow yCaCO_3(s)+2yMOH(aq)$; and in a subsequent and final step ee2, the calcium carbonate is decomposed to produce calcium oxide and carbon dioxide by the generalized reaction $yCaCO_3(s) \rightarrow CaO(s)+yCO_2(g)$.

26. The magnesiothermic method of claim 23 wherein:

in a subsequent step cc3, the alkali metal bicarbonate is decomposed to produce an alkali metal carbonate plus carbon dioxide plus water by the generalized reaction $2yMHCO_3(aq) \rightarrow yM_2CO_3(aq,s)+yCO_2(g)+yH_2O(liq)$;

in a subsequent step dd3, the alkali metal carbonate is reacted with calcium hydroxide to produce calcium carbonate and alkali metal hydroxide by the generalized reaction $yM_2CO_3(aq)+yCa(OH)_2(s) \rightarrow yCaCO_3(s)+2yMOH(aq)$;

in a subsequent step ee3, the calcium carbonate is decomposed to produce calcium oxide and carbon dioxide by the generalized reaction $yCaCO_3(s) \rightarrow yCaO(s)+yCO_2(g)$; and in a subsequent and final step ff3, the calcium oxide is reacted with water to produce calcium hydroxide by the generalized reaction $yCaO(s)+yH_2O(liq) \rightarrow yCa(OH)_2(s)$.

27. The magnesiothermic method of claim 17 wherein one or more impurities are removed from at least one of alkali metal hydroxide, alkali metal silicate, silica product, alkali metal bicarbonate, and alkali metal carbonate.

28. The magnesiothermic method of claim 27 wherein the impurities include one or more of the following elements: boron, phosphorous, aluminum, calcium, copper, iron, potassium, magnesium, sodium and titanium.

29. A magnesiothermic method of producing solid silicon comprising:

(a) reacting solid silica and magnesium gas at a temperature within a range from about 400° C. to about 1000° C. to produce solid silicon and solid magnesium oxide by the reaction $SiO_2(s)+2Mg(g) \rightarrow Si(s)+2MgO(s)$, the solid silicon having purity within a range from 98.0 to 99.9999%;

(b) separating the solid silicon from the solid magnesium oxide using an electrostatic technology; and (c) converting the solid magnesium oxide back to magnesium gas by the reaction $2MgO(s)+(Fe)Si(s) \rightarrow 2Mg(g)+Fe(s)+SiO_2(s)$.

30. The magnesiothermic method of claim 29 wherein step a additionally comprises purifying the solid silicon by melting and directional solidification.

31. The magnesiothermic method of claim 29 additionally comprising purifying the source of the magnesium gas before reacting the magnesium gas with the solid silica in step a.

32. The magnesiothermic method of claim 29 wherein the solid silica comprises synthetic silica.

33. The magnesiothermic method of claim 32 wherein the synthetic silica is produced by a process comprising:

providing alkali metal silicate;

reacting the alkali metal silicate with carbon dioxide and water to produce silica and alkali metal bicarbonate; and conducting one or more subsequent reactions, such that in the overall process at least two materials are internally consumed and regenerated in closed chemical loops, the at least two materials being selected from the carbon dioxide of the preceding reaction, the alkali metal bicarbonate of the preceding reaction, calcium oxide and alkali metal hydroxide.

34. A magnesiothermic method of producing solid silicon comprising:

(a) reacting solid silica and magnesium gas at a temperature within a range from about 400° C. to about 1000° C. to produce solid silicon and solid magnesium oxide by the reaction $SiO_2(s)+2Mg(g) \rightarrow Si(s)+2MgO(s)$, the solid silicon having a purity within a range from 98.0 to 99.9999%;

(b) separating the solid silicon from the solid magnesium oxide using an electrostatic technology; and (c) converting the solid magnesium oxide of step (a) to either solid, anhydrous magnesium chloride, $MgCl_2(s)$, or solid partially or fully hydrated magnesium chloride, $MgCl_2.xH_2O(s)$, or aqueous magnesium chloride, $MgCl_2(aq)$.

35. The magnesiothermic method of claim 34 wherein step a additionally comprises purifying the solid silicon by melting and directional solidification.

36. The magnesiothermic method of claim 34 additionally comprising purifying the source of the magnesium gas before reacting the magnesium gas with the solid silica in step a.

37. The magnesiothermic method of claim 34 wherein the solid silica comprises synthetic silica.

38. The magnesiothermic method of claim 37 wherein the synthetic silica is produced by a process comprising:

providing alkali metal silicate;

reacting the alkali metal silicate with carbon dioxide and water to produce silica and alkali metal bicarbonate; and conducting one or more subsequent reactions, such that in the overall process at least two materials are internally consumed and regenerated in closed chemical loops, the at least two materials being selected from the carbon dioxide of the preceding reaction, the alkali metal bicarbonate of the preceding reaction, calcium oxide and alkali metal hydroxide.

39. A magnesiothermic method of producing solid silicon comprising:

reacting solid silica and magnesium gas at a temperature within a range from about 400° C. to, about 1000° C. to produce solid silicon and solid magnesium oxide by the reaction $SiO_2(s)+2Mg(g) \rightarrow Si(s)+2MgO(s)$, the solid silicon having a purity within a range from 98.0 to 99.9999%; and separating the solid silicon from the solid magnesium oxide using an electrostatic technology, wherein the solid silica comprises synthetic silica produced by a process comprising:

providing alkali metal silicate;

reacting the alkali metal silicate with carbon dioxide and water to produce silica and alkali metal bicarbonate; and conducting one or more subsequent reactions, such that in the overall process at least two materials are internally consumed and regenerated in closed chemical loops, the at least two materials being selected from the carbon dioxide of the preceding reaction, the alkali metal bicarbonate of the preceding reaction, calcium oxide and alkali metal hydroxide.

* * * * *